United States Patent
Dutra e Mello et al.

(10) Patent No.: US 11,491,441 B2
(45) Date of Patent: Nov. 8, 2022

(54) METHODS AND SYSTEMS FOR REMOVING CONTAMINANTS FROM FLUE GAS ON A SHIP OR OFFSHORE FLOATING VESSEL USING A ROTATING PACKED BED DEVICE

(71) Applicant: Chevron U.S.A. Inc., San Ramon, CA (US)

(72) Inventors: Marcus Vinicius Dutra e Mello, Moraga, CA (US); Vijay R. Sampath, San Ramon, CA (US); Steven Xugi Song, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/995,278

(22) Filed: Jun. 1, 2018

(65) Prior Publication Data

US 2018/0361312 A1 Dec. 20, 2018

Related U.S. Application Data

(60) Provisional application No. 62/520,660, filed on Jun. 16, 2017.

(51) Int. Cl.
*B01D 53/14* (2006.01)
*B01D 53/18* (2006.01)
(Continued)

(52) U.S. Cl.
CPC ......... *B01D 53/24* (2013.01); *B01D 53/1493* (2013.01); *B01D 53/18* (2013.01);
(Continued)

(58) Field of Classification Search
CPC .. F01N 2590/02; F01N 3/085; F01N 2570/04; B01D 53/1481; B01D 53/50;
(Continued)

(56) References Cited

U.S. PATENT DOCUMENTS 7,850,936 B2    12/2010   Levasseur et al.
8,388,737 B2    3/2013   Gelowitz et al.
(Continued)

FOREIGN PATENT DOCUMENTS

CN    103977692    8/2014
CN    103977692 A    *   8/2014    ............ B01D 53/78
(Continued)

OTHER PUBLICATIONS

Tim Lenior, "Analytical Techniques for the determination of sulphur components in flue gas, fuel gas and natural gas.", 2009 (need to request copyright clearance).
(Continued)

*Primary Examiner* — Timothy C Vanoy
(74) *Attorney, Agent, or Firm* — Howard Owens

(57) ABSTRACT

A method for scrubbing flue gas, comprising: providing a rotating packed bed device onboard a ship or an offshore floating vessel; mixing seawater with the flue gas under centrifugal force in the rotating packed bed device to prevent blow-by and produce a scrubbed flue gas having low sulfur; and discharging the scrubbed flue gas; wherein the scrubbed flue gas has less than half of the sulfur that was originally present in the flue gas before the mixing. Also, a system for scrubbing the flue gas according to the method described. Also, a marine ship, comprising: an engine that combusts HSFO; a rotating packed bed device, in a hull or funnel of the ship, comprising a rotating shaft and a porous material that mixes seawater with flue gas and reduces sulfur in the flue gas; and a connector from the engine and the rotating packed bed device.

38 Claims, 8 Drawing Sheets

(51) Int. Cl.
*B01D 53/24* (2006.01)
*B01D 53/50* (2006.01)
*B01D 53/78* (2006.01)
*B01D 53/56* (2006.01)

(52) U.S. Cl.
CPC ......... *B01D 53/502* (2013.01); *B01D 53/504* (2013.01); *B01D 53/56* (2013.01); *B01D 53/78* (2013.01); *B01D 2252/1035* (2013.01); *B01D 2257/302* (2013.01); *B01D 2258/01* (2013.01); *B01D 2258/0283* (2013.01); *B01D 2259/4566* (2013.01)

(58) Field of Classification Search
CPC .. B01D 53/502; B01D 53/78; B01D 2221/08; B01D 2252/1035; B01D 2257/302; B01D 2258/01; B01D 2258/012; B01D 53/24; B01D 53/18; B01D 53/504; B01D 2259/4566; B01D 2258/0283; B01D 53/1493; B01D 53/56; B63J 4/00
See application file for complete search history.

(56) References Cited

U.S. PATENT DOCUMENTS

| | | | |
|---|---|---|---|
| 8,448,926 B2 | 5/2013 | Dutra e Mello et al. | |
| 8,500,893 B2 | 8/2013 | Peng | |
| 8,702,071 B2 | 4/2014 | Mello et al. | |
| 9,005,534 B2 | 4/2015 | Kimura | |
| 9,040,005 B2 * | 5/2015 | Hansen | B01D 47/00 423/212 |
| 9,216,377 B1 | 12/2015 | Dutra e Mello et al. | |
| 9,675,933 B2 | 6/2017 | Stuhler et al. | |
| 10,099,175 B2 * | 10/2018 | Takahashi | B01D 53/1412 |
| 2004/0015003 A1 | 1/2004 | Sheng et al. | |
| 2009/0151563 A1 | 6/2009 | Young et al. | |
| 2011/0131937 A1 | 6/2011 | Hsien et al. | |
| 2015/0283499 A1 | 10/2015 | Brown et al. | |
| 2016/0317967 A1 | 11/2016 | Murali et al. | |
| 2018/0016159 A1 | 1/2018 | Mello et al. | |

FOREIGN PATENT DOCUMENTS

| | | | |
|---|---|---|---|
| CN | 104492210 | 4/2015 | |
| CN | 104511235 A | 4/2015 | |
| CN | 103463936 B | 10/2015 | |
| CN | 103480259 B | 12/2015 | |
| CN | 105311947 A | 2/2016 | |
| CN | 105879628 A | 8/2016 | |
| CN | 104587814 B | 2/2017 | |
| CN | 104587815 B | 2/2017 | |
| CN | 104587816 B | 2/2017 | |
| CN | 106606909 | 5/2017 | |
| EP | 1073508 A1 | 2/2001 | |
| EP | 1073508 B1 | 1/2003 | |
| EP | 2301647 B1 | 1/2016 | |
| EP | 3281728 A1 | 2/2018 | |
| JP | 2013 208958 A * | 10/2013 | ............ B63H 21/32 |
| JP | 2013208958 A | 10/2013 | |
| JP | 2014 233702 A * | 12/2014 | ............... C02F 1/74 |
| WO | WO 2017 169045 A1 * | 10/2017 | ............ B01J 19/32 |

OTHER PUBLICATIONS

"Exhaust Gas Scrubbing Systems", Wartsila, Mar. 11, 2011.

* cited by examiner

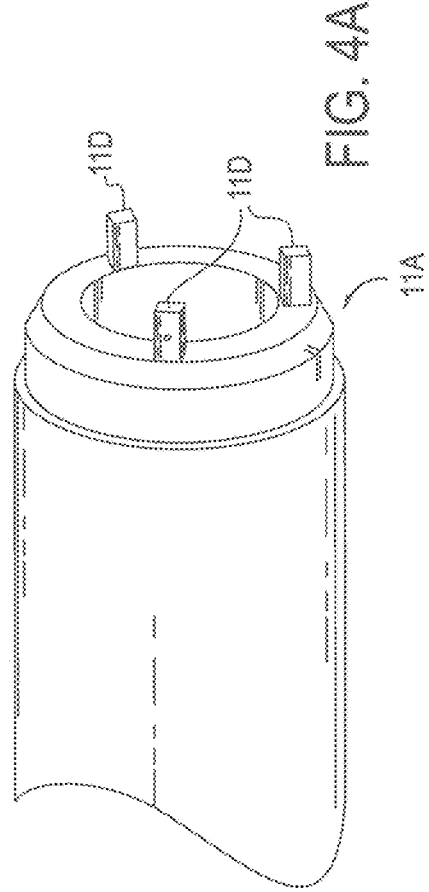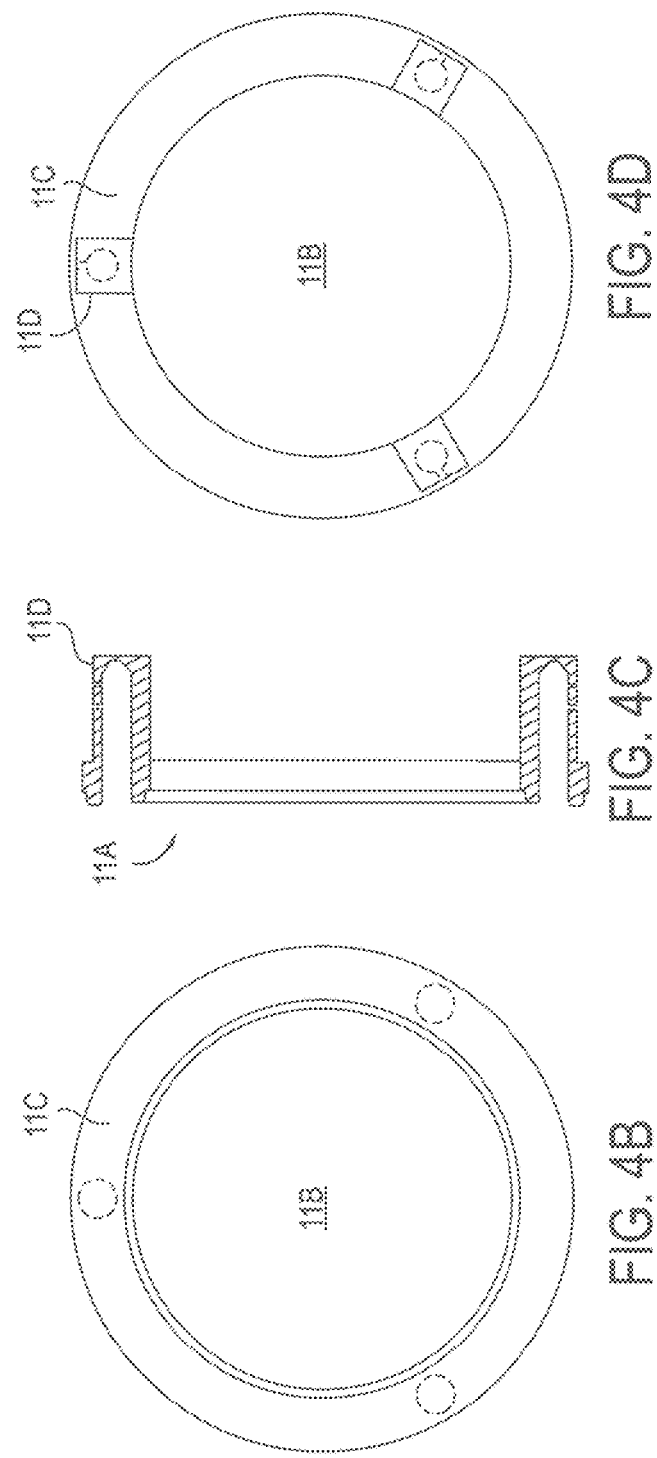

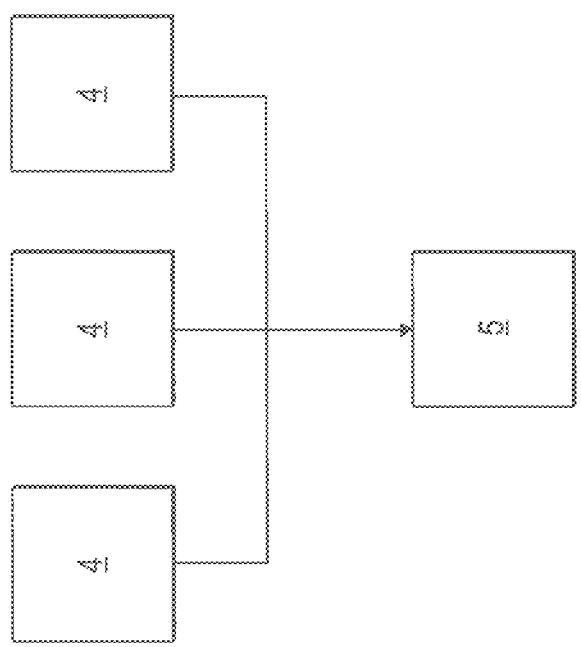

METHODS AND SYSTEMS FOR REMOVING CONTAMINANTS FROM FLUE GAS ON A SHIP OR OFFSHORE FLOATING VESSEL USING A ROTATING PACKED BED DEVICE

TECHNICAL FIELD

This application is directed to improved methods and systems for removing contaminants from flue gas onboard of ships or other offshore floating vessels using a rotating packed bed device.

BACKGROUND

In October 2020, the International Marine Organization (IMO) will lower the global sulfur limit of marine fuels at sea to 0.5 wt %. The decision by the IMO to lower the global sulfur limit of marine fuels at sea to 0.5 wt % is expected to have a profound impact on the fuel oil and bunker fuel market, especially once the change is fully enacted in 2020. The reduction in the sulfur specification was made to reduce the sulfur oxide that is released to the atmosphere in the flue gas from the combustion of the marine fuel.

Ships outside emissions control areas can currently burn fuel with a maximum sulfur content of 3.5 wt % sulfur. Ship owners will struggle to find new sources of marine fuel that will meet the new environmental standards set by the IMO. For example, bunker marine fuel suppliers and ship owners in 2015 had to switch from using dirty low-sulfur bunker fuel to much costlier marine gasoil (MGO), when the maximum sulfur content in the North American Emissions Control Area was lowered to 0.1 wt % sulfur from 1 wt % sulfur. Producing low sulfur marine fuel, or low sulfur fuel oil (LSFO), requires huge investments by the refining industry.

Seawater/caustic scrubbing of flue gas, generated from combustion of high sulfur fuel oil (HSFO) on board of ships, is an emerging alternative solution to reduce the sulfur oxides (including sulfur dioxide) in the flue gas, and thus enable the marine fuel to meet future IMO Bunker Fuel specification changes. Ship owners are working on models to compare installing flue gas scrubbers versus using low sulfur fuel, but limited options have been available to test.

Marine environments are unstable and due to wave action, wind, and other forces that can cause motion, conventional scrubbers are subject to blow-by and unstable performance. Due to the unstable and often unpredictable motion on ships it can be difficult to maintain effective contact between flue gases and either liquids or solids that are used to scrub flue gases. As a result, conventional flue gas scrubbing systems need to be overdesigned, which increases one or more of cost, weight, height, and footprint.

Previous systems for flue gas scrubbing, such as those using fluidized beds or packed bed spray scrubbers, have been very large and heavy. Previous systems would also be difficult to retrofit onto existing ships.

Improved methods and systems are needed for removing contaminants comprising sulfur oxides, such as sulfur dioxide, from flue gas onboard of ships or other onboard offshore floating vessels. Improved marine ships are needed that remove flue gas contaminants more efficiently.

SUMMARY

This application provides a method for removing contaminants from a flue gas, on a ship or on an offshore floating vessel, comprising:

a. providing a rotating packed bed device onboard of the ship or onboard of the offshore floating vessel;

b. mixing a seawater, having less than 20 wt % total suspended solids, with the flue gas in the rotating packed bed device, under a sufficient centrifugal force in the rotating packed bed device to prevent a blow-by of the flue gas and producing a scrubbed flue gas;

c. discharging the scrubbed flue gas from the ship or the offshore floating vessel;

wherein a volume flow ratio of a flue gas-volume flow rate to a seawater-volume flow rate during the mixing is from 1:1 to 300:1; and wherein the flue gas has from 0.1 wt % up to 5.0 wt % of a sulfur and the scrubbed flue gas has from zero to less than 1.0 wt % of the sulfur, which is less than half of the sulfur that was originally present in the flue gas before the mixing.

This application also provides a system for removing the contaminants from the flue gas on the ship according to the method described above, comprising:

a. the rotating packed bed device on the ship or the offshore floating vessel; and b. a connector from an exhaust pipe on an engine on the ship or the offshore floating vessel that feeds the flue gas to the rotating packed bed device; and c. a lift pump connected to a liquid inlet of the rotating packed bed device for drawing a seawater from an ocean environment into the rotating packed bed device.

This application also provides a marine ship, comprising:

a. an engine that combusts a high sulfur fuel oil (HSFO);

b. a lift pump that draws a seawater into the marine ship;

c. a rotating packed bed device, in a hull or a funnel of the marine ship, comprising a rotating shaft and a porous material in a rotating packed bed configured to mix the seawater with a flue gas from the engine in an outwardly direction and at a volume flow ratio of a flue gas-volume flow to a seawater-volume flow rate from 1:1 to 300:1 within the rotating packed bed device to reduce a sulfur in the flue gas; and d. a connector from an exhaust pipe on the engine and the rotating packed bed device.

The present invention may suitably comprise, consist of, or consist essentially of, the elements in the claims, as described herein.

BRIEF DESCRIPTION OF THE DRAWINGS

FIGS. 4A-4D show four views of a liquid distributor of a rotating backed bed device, according to a further exemplary embodiment.

FIG. 7 is a block diagram illustrating an exemplary system with multiple rotating packed bed devices connected to a single level control vessel.

GLOSSARY

Figure 1:
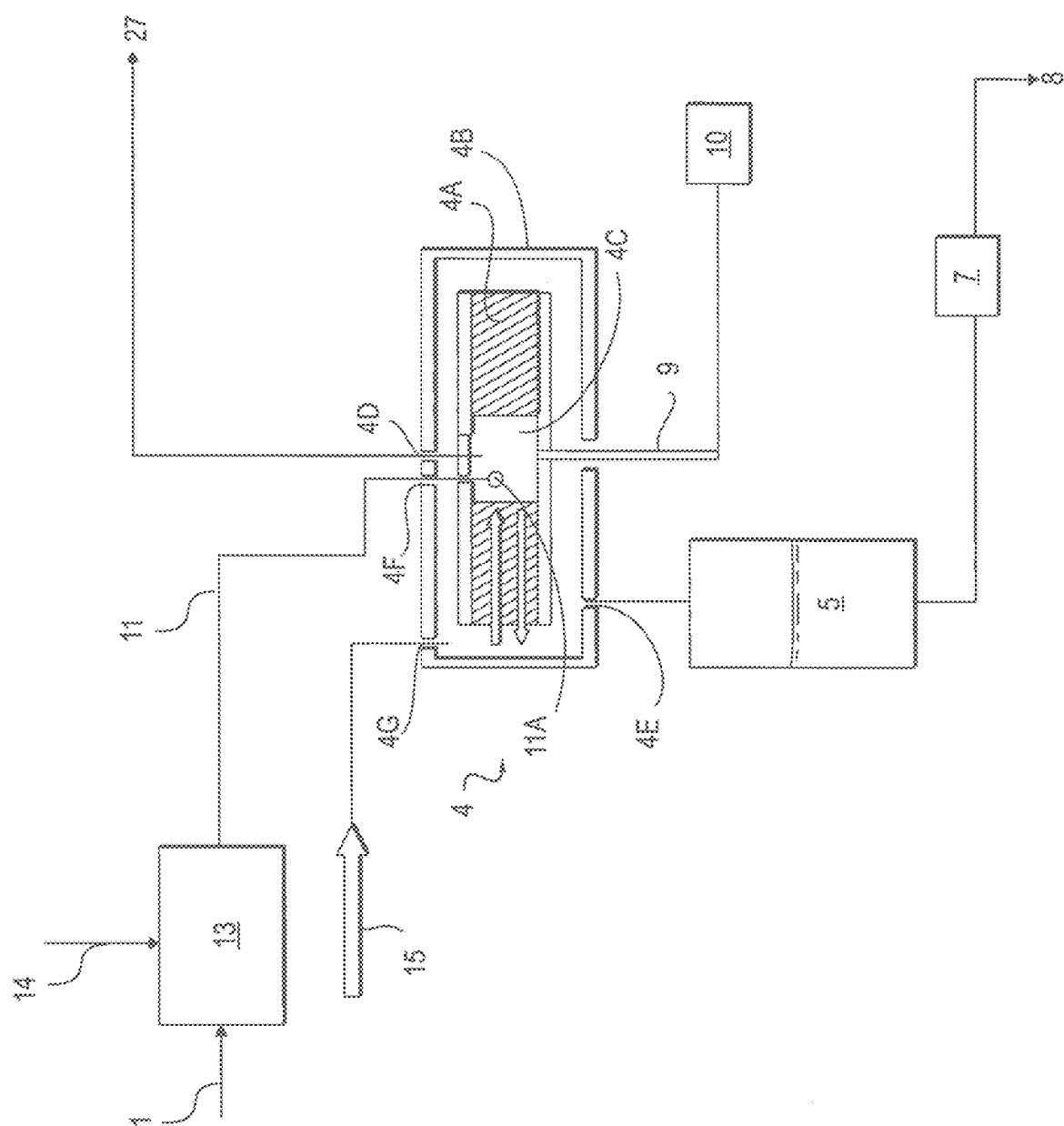
FIG. 1 is a schematic diagram illustrating a system according to an exemplary embodiment.

A "ship" is a large watercraft that travels the world's oceans and other sufficiently deep waterways, carrying passengers or goods, or in support of specialized missions, such as defense, research and fishing. A "marine ship" is a ship operated in an ocean or in seawater.

"Periodic Table" refers to the International Union of Pure and Applied Chemistry (IUPAC) Periodic Table of the Elements, version dated 22 Jun. 2007.

An "alkali" is a basic, ionic salt of an alkali metal or alkaline earth metal chemical element.

An alkali also can be defined as a base that dissolves in water. A solution of a soluble base has a pH greater than 7.0.

"Sulfur oxide" (SOx) refers to one or more of the following: lower sulfur oxides (such as $S_7O_2$ and $S_6O_2$), sulfur monoxide (SO), sulfur dioxide ($SO_2$), sulfur trioxide ($SO_3$), higher sulfur oxides ($SO_3$ and $SO_4$ and polymeric condensates of them), disulfur monoxide ($S_2O$), and disulfur dioxide ($S_2O_2$).

"Lower sulfur oxides" are a group of inorganic compounds with the formula $S_mO_n$, where m<2n.

"Flue gas" is a gas exiting to the atmosphere via a flue, which is a pipe or channel for conveying exhaust gases from a fireplace, an engine, an oven, a furnace, a boiler or a steam generator. The flue gas, for example, can refer to the combustion exhaust gas produced by an engine.

"Total suspended solids" (TSS) is the dry-weight of particles trapped by a filter. It is a water quality parameter used for example to assess the quality of wastewater after treatment in a wastewater treatment plant. TSS is listed as a conventional pollutant in the U.S. Clean Water Act.

"Heavy fuel oil" (HFO) describes fuels used to generate motion and/or fuels to generate heat that have a particularly high viscosity and density. Heavy fuel oil can be defined either by a density of greater than 900 kg/m$^3$ at 15° C. or a kinematic viscosity of more than 180 mm$^2$/s at 50° C. Heavy fuel oils can have large percentages of heavy molecules such as long-chain hydrocarbons and aromatics with long-branched side chains, and they may be black in color.

"High sulfur fuel oil" (HFSO) refers to a heavy fuel oil having greater than 1.0 wt % sulfur.

"Lift pump" refers to a pump that raises a fluid to a higher level. A lift pump often consists of a piston and vertical cylinder with flap or ball valves in both the piston and the base of the vertical cylinder.

"Centrifugal force" is an inertial force directed away from the axis of rotation that appears to act on all objects when viewed in a rotating frame of reference.

The radial force generated by a spinning rotor is expressed relative to the earth's gravitational force and therefore is known as the relative centrifugal force (RCF) or the "g force." The g force acting on particles is exponential to the speed of rotation (defined as revolutions per minute (RPM)). The function between these two parameters follows this equation: RCF=1.2 r (RPM/1000)(RPM/1000), where r is in millimeters.

"Turndown ratio" refers to the width of the operational range of a device, and is defined as the ratio of the maximum operating capacity to minimum operating capacity. For example, a device with a maximum output of 10 units and a minimum output of 2 units has a turndown ratio of 5.

"Antiscalant agents" are a family of chemicals designed to inhibit the formation and precipitation of crystallized mineral salts that form scale.

DETAILED DESCRIPTION

Sufficient centrifugal force in the context of this invention can be a RCF that is sufficient to promote good gas-liquid contact and prevent a blow-by of the flue gas 15 during operation of a rotating packed bed device 4. In one embodiment, the RCF can be greater than 1, such as from greater than 4 up to 10,000. Blow-by can be caused by motion on the ship or on the offshore floating vessel, and can be very difficult to prevent using conventional flue gas 15 scrubbers.

In one embodiment, the sufficient centrifugal force provides a seawater holdup in the rotating packed bed device 4 that is less than 1 wt %, such as from 0.01 to 0.50 wt %. The low seawater holdup reduces weight and provides efficient use of a porous material in the rotating packed bed device 4. For example, in one embodiment, the rotating packed bed device 4 comprises one or more rotatable packing rings 4A of a porous material that operate under a sufficient centrifugal force to provide a seawater holdup in the rotating packed bed device 4 from 0.01 to 0.50 wt %.

In one embodiment, the rotating packed bed device 4 comprises a porous material with a high surface area per unit volume, such as greater than 150 m$^2$/m$^3$, or from about 200 to about 6,000 m$^2$/m$^3$. In one embodiment, the rotating packed bed device 4 comprises one or more rotatable packing rings 4A comprising a porous material with a high surface area per unit volume.

In one embodiment, the rotating packed bed device 4 comprises one or more rotatable packing rings 4A that comprise the porous material.

Referring to the exemplary embodiment in FIG. 1, methods disclosed herein can utilize a system as shown, including a rotating packed bed device. In this embodiment, the rotating packed bed device 4 includes one or more rotatable packing rings 4A disposed with a housing 4B. The one or more rotatable packing rings 4A can generally have the shape of a thick cylindrical disk having a hollow central axial portion or space, also referred to herein as an interior region 4C. The rotatable packing rings 4A surrounding the interior region define the interior region 4C. The rotatable packing rings 4A are enclosed in a space inside the housing 4B. This space is the exterior region 4H in the rotating packed bed device, which is not labeled in FIG. 1. In the embodiment shown in FIG. 1, the low-pressure flue gas 15 flows into the exterior region 4H and a liquid inlet 4F is provided in the housing 4B that feeds a seawater 1 into the interior region 4C.

In another embodiment, the low-pressure flue gas 15 and the seawater 1 can be co-fed into the interior region 4C.

In one embodiment, a pressure increase forms between an interior region 4C in the rotating packed bed device 4 and an exterior region 4H in the rotating packed bed device 4. The pressure increase can be 0 kPa or greater, such as greater than 2 or 3 kPa, for example, from 0 kPa to 50 kPa. This pressure increase can function like a blower, and can help push low-pressure flue gas 15 from an engine through the rotating packed bed device 4. The pressure increase can significantly reduce or prevent undesired back pressure on an engine on a ship or an offshore floating vessel. This can be highly desirable when dealing with low-pressure flue gas 15. In one embodiment, the maximum allowed back pressure that a ship engine can tolerate is 981 Pa, and the rotating packed bed device 4 is configured to prevent back pressure on the ship engine.

The high gravity created by the centrifugal force of the rotatable packing rings 4A allows the use of unique packing materials with very high surface area and fine pore diameter. The rotatable packing rings 4A can be made from wide variety of suitable materials, including for example, metal foam, plastic, composite, stainless steel, titanium, super duplex stainless steel alloy, metal or non-metal wire mesh, knitted fabrics, and porous materials including fiberglass. In one embodiment, the rotatable packing rings 4A comprise a porous material with a surface area per unit volume (specific surface) from about 200 to about 6,000 $m^2/m^3$. In one embodiment, the rotatable packing rings 4A comprise a porous material that is a metal foam, a metal mesh, a fiberglass, a polymer, or a composite thereof. In one embodiment, the porous material has an average pore size from 100 to 10,000 micrometers. In one embodiment, the porous material is a metal foam having a porosity of at least about 90% and having an average pore size from 250 to 2500 micrometers. In one embodiment, the metal foam is a RECEMAT® metallic foam (RMF). RECEMAT is a registered trademark of RECEMAT BV, based in the Netherlands. RMF is one of the commercially available metallic foams and it is an open cell polyurethane foam metallized using an electro-deposition technique which has superior control on the cell size. In one embodiment, the RMF has a nickel microstructure, a nickel-chromium (NC) microstructure or a nickel-chromium extra foam (NCX) microstructure. In one embodiment the metal foam has a thickness from 1.6 to 20 mm and pore sizes from 0.4 to 2.3 mm. In one embodiment the metal foam has a designation of NCX0610, NCX1116, NCX1723, NCX2733, or NCX4753. The typical properties of these types of metal foams are summarized in Table 1.

packed bed device 4 comprises one or more rotatable packing rings 4A. In this embodiment, the one or more rotatable packing rings 4A can define an interior region 4C and an exterior region 4H in the rotating packed bed device 4, and wherein a gas inlet and a liquid inlet are positioned in the interior region 4C and provide flows of the flue gas 15 and the seawater 1 directionally outward from the interior region 4C to the exterior region 4H. Some of the benefits that can be realized from the embodiment of the rotating packed bed device having flows of the flue gas 15 and the seawater 1 directionally outward from the interior region 4C to the exterior region 4H are improved pressure increase and reduced power consumption.

The high centrifugal force that is created by the rotatable packing rings 4A allows the formation of thin liquid films, small droplets, and high liquid-gas interfacial areas in the packing leading to significant enhancements in mass transfer. The liquid spins out of the rotatable packing rings 4A, hits the housing 4B, and exits at the liquid outlet 4E.

In one embodiment, gas flows counter-currently to seawater in the rotating packed bed device 4 from the outside of the rotatable packing rings 4A toward the center of the packing rings (radially inwardly) and exits the rotating packed bed device 4 from a gas outlet 4D.

In one embodiment, during the mixing of the seawater 1 with the flue gas 15 in the rotating packed bed device 4, one or more rotatable packing rings 4A in the rotating packed bed device 4 rotate at a speed of from 200 to 3000 RPM.

In one embodiment, the rotating packed bed device 4 comprises one or more rotatable shafts 9 connected to a motor 10. The one or more rotatable shafts 9 can be oriented in any direction, due to the highly efficient mixing and mass transfer that is obtained under the sufficient centrifugal force. Examples of orientations of the rotatable shafts 9 include: horizontal (0 degrees), vertical (90 degrees), all angles from 0 to 360 degrees, and combinations thereof.

A rotatable shaft 9 can be coupled to the one or more rotatable packing rings 4A to cause the one or more rotatable packing rings 4A to rotate. A motor 10 can be coupled to the rotatable shaft 9 to drive the rotatable shaft. In some embodiments, the rotatable packing rings 4A can rotate at a speed greater than 200 RPM, such as from 200 to 3000 RPM, or from 300 to 2500 RPM. In some embodiments, the rotatable packing rings 4A rotate at a high tip velocity,

TABLE 1

| Designation | NCX0610 | NCX1116 | NCX1723 | NCX2733 | NCX4753 |
|---|---|---|---|---|---|
| Grade (pores/inch) | 6 ... 10 | 11 ... 16 | 17 ... 23 | 27 ... 33 | 47 ... 53 |
| Average pore size, micrometers | 2300 | 1400 | 900 | 600 | 400 |
| Average density, g/cm$^3$ | 0.5 ... 0.9 | 0.5 ... 0.9 | 0.5 ... 0.9 | 0.5 ... 0.9 | 0.5 ... 1.3 |
| Porosity | 92% | 92% | 92% | 92% | 92% |
| Specific Surface, m$^2$/m$^3$ | 500 | 1000 | 1600 | 2800 | 5400 |
| Avg. Composition*, Wt % | | | | | |
| Al | | | — | | |
| C | | | <0.1 | | |
| Cr | | | 30-45 | | |
| Cu | | | 0.3 | | |
| Fe | | | 5 | | |
| Mo | | | <0.1 | | |
| Mn | | | <0.1 | | |
| Ni | | | 49-64 | | |
| P | | | <0.1 | | |

*Average composition refers to the composition of the outside surface of the metal foam.

In one embodiment, the rotating packed bed device 4 is configured to propel the flue gas 15 and the seawater 1 directionally outward through the rotating packed bed device 4. For example, in one embodiment, the rotating greater than 1 m/s, such as at a tip velocity of 3 to 200 m/s. In one embodiment, during the infusing step b), the one or more rotatable packing rings 4A rotate at a tip velocity of 3 to 200 m/s.

A liquid inlet 4F is provided in the housing 4B for feeding a seawater 1 into the interior region 4C. The liquid inlet 4F is in communication via a liquid conduit 11 with an exit port 11A disposed in the interior region 4C for infusing the seawater 1 into the interior region 4C. During operation in which the rotatable packing rings 4A rotate, the seawater 1 passes radially outwardly through the rotatable packing rings 4A and exits the rotating packed bed device 4 via a liquid outlet 4E.

A gas inlet 4G is provided in the housing 4B to allow a flue gas 15 to be injected into the housing 4B, within the exterior region 4H, within the interior region 4C, or within both the exterior region 4H and the interior region 4C. Typically this flue gas 15 can have greater than 0.1 wt % sulfur, and is thus not suitable for discharging into the atmosphere. The contacting of the flue gas 15 with the seawater 1 in the rotating packed bed device 4 removes the sulfur from the flue gas 15 and produces a scrubbed flue gas 27 that comprises less than 0.1 wt % sulfur and is suitable for discharging into the atmosphere. In one embodiment, a ratio of the flue gas 15 to the seawater 1 during the contacting in the rotating packed bed device 4 is from 1.0 to 300 standard cubic feet of flue gas 15 per standard cubic feet of seawater 1.

A gas outlet 4D, connected to a gas conduit, is provided in the housing 4B for eluting the scrubbed flue gas 27 from the rotating packed bed device 4. A portion, or all, of the scrubbed flue gas 27 can be vented directly to the atmosphere. In one embodiment, the discharging of the scrubbed flue gas 27 is to the atmosphere without any further treatment.

Figure 3:
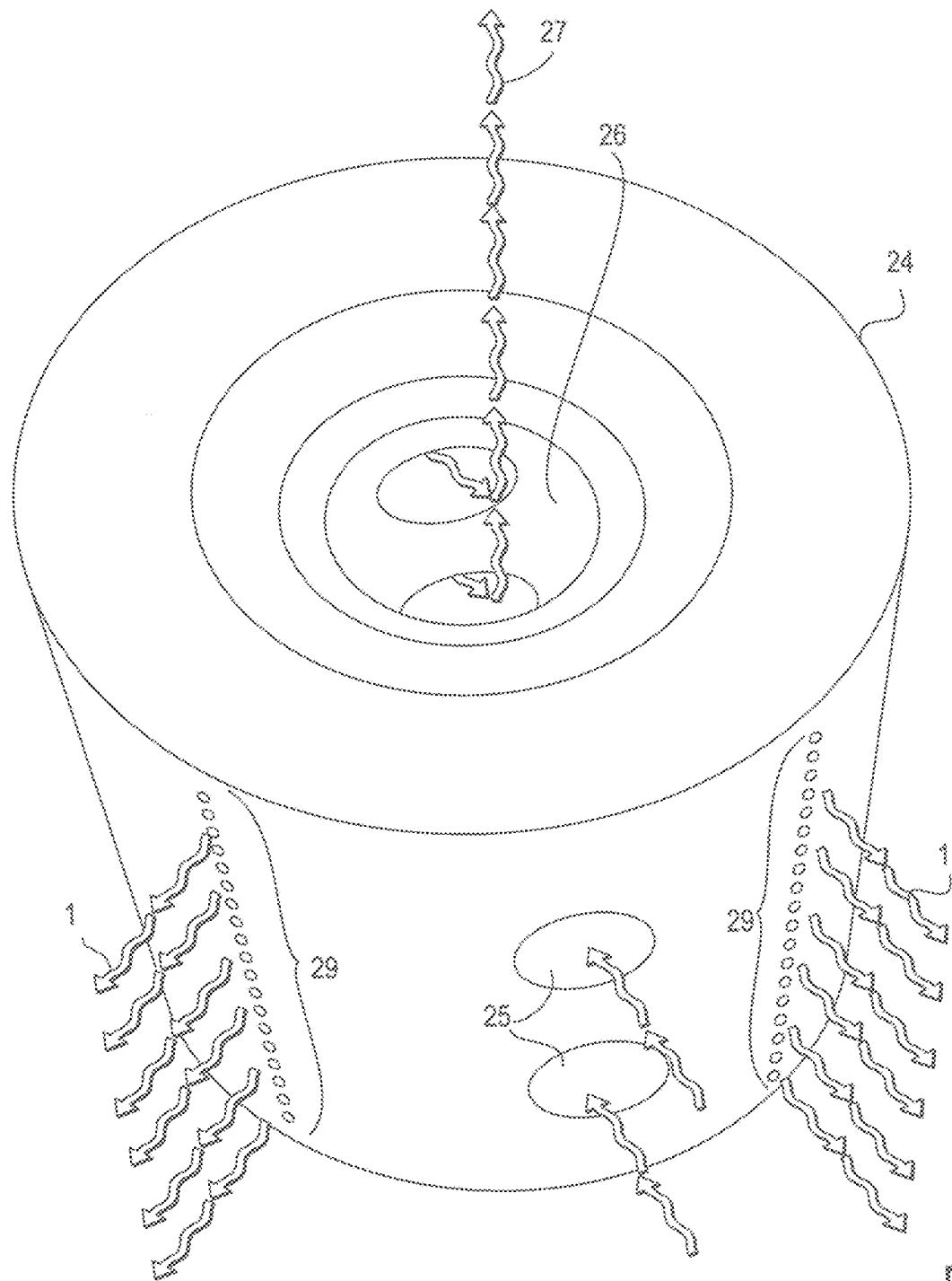
FIG. 3 is an example of a liquid distributor of a rotating packed bed device according to yet another exemplary embodiment.

Although not shown in FIG. 1, a liquid distributor 24 can be placed in the interior region 4C. The liquid distributor 24 can comprise the exit port 11A disposed in the interior region 4C for infusing the seawater 1 having less than 20 wt % total suspended solids into the interior region 4C. Non-limiting examples of liquid distributors are shown in FIGS. 3 and 4.

The seawater 1 facilitates the removal of the contaminants from the flue gas 15. In one embodiment, the seawater 1 removed from the housing 4B in step c) has absorbed or reacted with the contaminants from the flue gas 15. In some embodiments, the seawater 1 comprises a seawater, an alkali, or a mixture thereof. In one embodiment, the seawater 1 comprises a seawater and the seawater is mixed with at least one additive 14 prior to or concurrently with infusing the seawater 1 by way of the exit port 11A into the interior region 4C. The additive 14 can include an alkali, or another additive 14 that enhances the sulfur, nitrogen oxide or other contaminant removal from the flue gas 15. In one embodiment, the additive 14 can include alkalis, oxygen scavengers, antiscalant agents, biocides, and combinations thereof. The additive 14 can be added to the seawater 1 in a mixer 13. In one embodiment, the additive 14 is mixed with water to make an additive mixture and the additive mixture is fed to the rotating packed bed device 4 through a second liquid inlet (not shown) for receiving the additive mixture.

In one embodiment, the seawater 1 comprises from 1 to 50 wt % alkali.

In one embodiment, the method comprises:
a. providing a rotating packed bed device 4 on the ship, wherein the rotating packed bed device 4 comprises: one or more rotatable packing rings 4A disposed within a housing 4B wherein the one or more rotatable packing rings 4A define an interior region 4C; a liquid inlet 4F in the housing 4B for feeding an seawater 1 having less than 20 wt % total suspended solids into the interior region 4C, the liquid inlet 4F in communication with an exit port 11A disposed in the interior region 4C for infusing the seawater 1 into the interior region 4C; a gas inlet 4G in the housing 4B for accepting the flue gas 15 comprising the contaminants; a gas outlet 4D for discharging a scrubbed flue gas 27, which has at least partially passed radially inwardly through the one or more rotatable packing rings 4A, from the interior region 4C; a liquid outlet 4E in the housing for removing the seawater 1 from the housing 4B; a rotatable shaft 9, coupled to the one or more rotatable packing rings 4A, that causes the one or more rotatable packing rings 4A to rotate; and a motor 10 coupled to the rotatable shaft 9 for driving the rotatable shaft 9.

In one embodiment, the method additionally comprises: infusing the seawater 1 by way of the exit port into the interior region 4C, wherein the seawater 1 passes radially outwardly through each of the one or more rotatable packing rings 4A and contacts the flue gas 15 thereby scrubbing the contaminants from the flue gas 15.

In one embodiment, the system further comprises a lift pump connected to the liquid inlet 4F of the rotating packed bed device 4 for drawing a seawater from an ocean environment into the rotating packed bed device 4.

In one embodiment, the system additionally comprises a level control vessel 5 connected to the liquid outlet 4E. In one or more embodiments, at least one level control vessel 5 is provided for receiving the discharged aqueous liquid 8 from the liquid outlet 4E. The level control vessel 5 accumulates the discharged aqueous liquid 8 and can be used to maintain a volume of the discharged aqueous liquid 8 in a subsequent spent seawater collector 7, especially if the spent seawater collector 7 comprises a pump that might be subject to cavitation.

In one embodiment, the system additionally comprises a spent seawater collector connected to a liquid outlet of the rotating packed bed device 4 that collects at least a portion of the seawater that is discharged from the rotating packed bed device 4.

Different configurations of rotating packed bed device 4 are suitable for use in the methods and systems disclosed herein. For example, a variety of suitable rotating packed bed devices are disclosed in U.S. Pat. Nos. 8,448,926, 8,702,071, and 9,216,377 (Dutra e Mello et al., all co-assigned).

Figure 2:
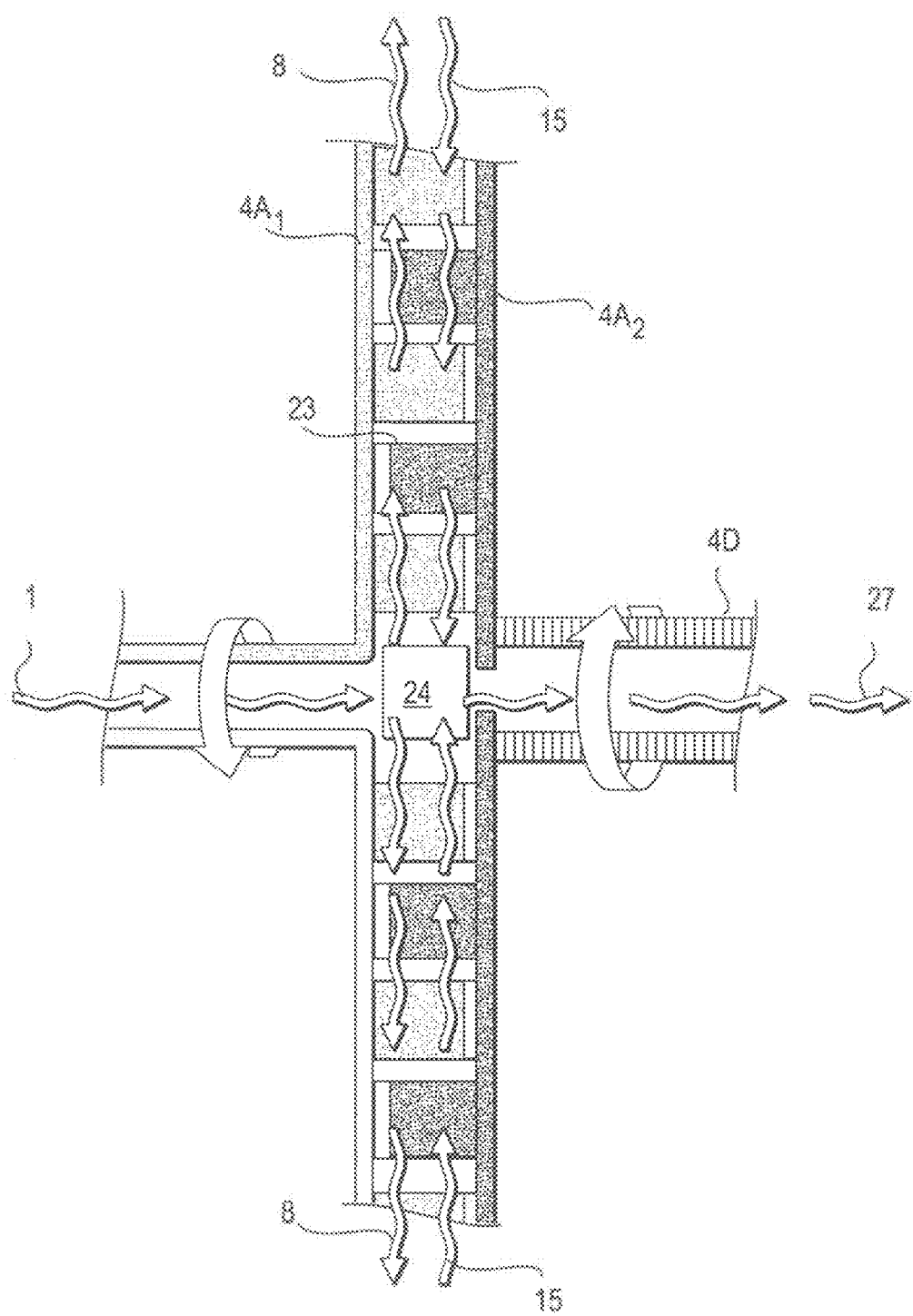
FIG. 2 is a simplified view of a rotating packed bed device according to another exemplary embodiment.

Referring to the exemplary embodiment in FIG. 2, the rotating packed bed device 4 can include two or more sets of rotatable packing rings 4A, such as a rotatable set of packing rings with three rings $4A_1$, and a rotatable set of packing rings with two rings $4A_2$. The two or more sets of rotatable packing rings 4A can enhance the mass transfer between the seawater 1 and the flue gas 15 and improve the sulfur removal from the flue gas 15. The rotation of each of the rotatable sets of rotatable packing rings 4A is driven by a rotatable shaft 9 coupled to a shaft motor (not shown). In one embodiment, two rotors connected to the rotatable set of packing rings with three rings $4A_1$ and the rotatable set of packing rings with two rings $4A_2$ can rotate in a co-current direction. In another embodiment, the two rotors as shown in FIG. 2 can rotate in a countercurrent direction. The number of rings on the rotatable packing rings 4A can vary, depending on factors such as the size and design of the system, and the flue gas 15 being accepted into the rotating packed bed device 4.

In one embodiment, the rotating packed bed device 4 comprises from one to five rotatable sets of packing rings 4A. In one embodiment, the rotatable sets of packing rings 4A can rotate in a co-current direction, in a counter-current direction, or in a combination thereof.

In one embodiment, the rotatable sets of packing rings rotate in a co-current direction, a counter-current direction, or a combination thereof.

FIG. 2 shows a simplified diagram of an embodiment of the rotating packed bed device 4 comprising a liquid distributor 24. As shown in FIG. 2, a liquid distributor 24 can be positioned in the middle of rotors in the rotating packed bed device 4. The seawater 1 enters and is dispersed to a rotatable set of packing rings, and scrubbed flue gas 27 is collected and withdrawn after passing through the rotatable packing rings 4A, via the liquid distributor 24. Flue gas 15 is accepted into the rotating packed bed device 4 and the scrubbed flue gas 27 with the reduced sulfur content exits the rotating packed bed device 4 after passing through the rotatable packing rings 4A along with the seawater 1. Gaps 23 can exist between the rotatable packing rings 4A. For example, gaps 23 are shown in FIG. 2 between the rotatable set of packing rings with three rings $4A_1$ and the rotatable set of packing rings with two rings $4A_2$. Vacuum may also be employed in the gaps 23 to facilitate sulfur removal from the flue gas 15.

FIG. 3 shows an example of a liquid distributor 24 that is a generally hollow cylinder. Scrubbed flue gas 27 that has passed through rotatable packing rings 4A is accepted in the gas outlet orifices 25. In one exemplary, nonlimiting embodiment, there are multiple (e.g., eight 1-inch (2.54 centimeters)) gas outlet orifices 25 extending radially through the liquid distributor 24. The scrubbed flue gas 27 converges into a center conduit 26 that evacuates the scrubbed flue gas 27 from the interior region 4C. Seawater 1, prior to mixing with the flue gas 15, is dispersed from the liquid distributor 24 and exits from a number of small liquid orifices 29 extending radially through the liquid distributor 24. In one embodiment, the liquid distributor 24 shown in FIG. 3 can be used in the rotating packed bed device 4 shown in FIG. 2.

The liquid inlet 4F in the housing 4B feeds the seawater 1 into the interior region 4C. In one embodiment, the liquid inlet 4F is in communication with an exit port 11A via a liquid conduit 11 disposed in the interior region 4C. The exit port 11A infuses the seawater 1 into the interior region 4C.

FIGS. 4A-4D show design features of an embodiment of a liquid distributor 24 for introducing the seawater 1 into the rotating packed bed device 4. In this embodiment, the liquid inlet 4F of the rotating packed bed device 4 further includes the liquid distributor 24. This liquid distributor 24 comprises a liquid conduit 11 that has an exit port 11A, a central conduit 11B, an annulus 11C around the central conduit 11B, and protruding tabs 11D. The seawater 1 is fed into the rotating packed bed device 4 through the annulus 11C. The annulus 11C is in fluid communication with a plurality of protruding tabs 11D that extend into the interior region 4C. The protruding tabs 11D can have one or more exit ports 11A therein for infusing the seawater 1 into the interior region 4C. In one embodiment, each of the protruding tabs 11D have one or more outwardly facing holes in the center of each of them. The central conduit 11B, in fluid communication with the interior region 4C, can be used to collect and remove the scrubbed flue gas 27 from the rotating packed bed device 4. In one embodiment, the liquid distributor 24 shown in FIGS. 4A-4D can be used in the rotating packed bed device 4 shown in FIG. 1.

In one embodiment, the system comprises multiple rotating packed bed devices 4. In one embodiment, the system can comprise multiple engines on the ship and multiple rotating packed bed devices 4. In one embodiment, each engine can be separately provided with a rotating packed bed device 4, or multiple engines can be connected to a single rotating packed bed device. When provided, these multiple rotating packed bed devices can be arranged in parallel, arranged in series, or arranged in a combination thereof. In one embodiment, the providing of the rotating packed bed device comprises providing multiple rotating packed bed devices. In one embodiment, each engine on the ship can be separately provided with a rotating packed bed device, and each rotating packed bed device can be operated and sized to meet the sulfur removal requirements on the flue gas from each engine.

Figure 5:
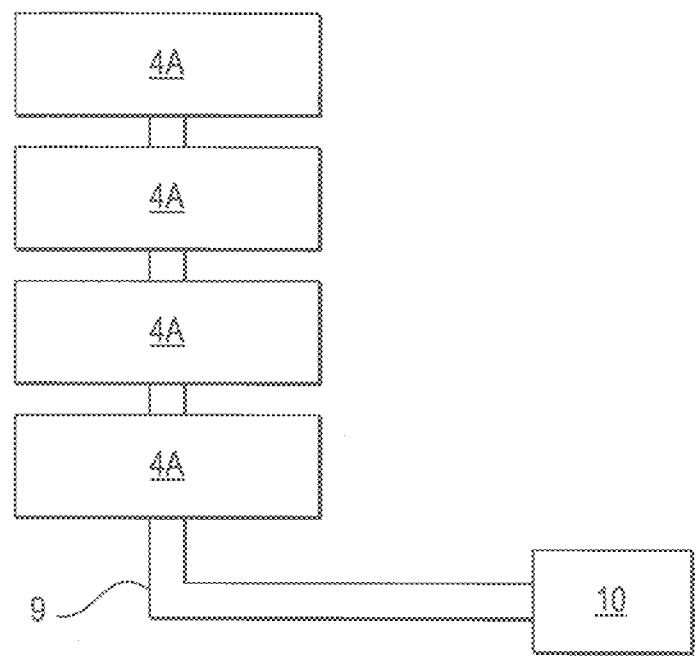
FIG. 5 is a block diagram illustrating an exemplary system with multiple rotating packed bed devices arranged in parallel.

In one embodiment, as shown in FIG. 5, the system comprises multiple rotating packed bed devices 4 arranged in parallel such that the rotatable shaft 9, coupled to the motor 10, is coupled to one or more rotatable packing rings 4A of each of the multiple rotating packed bed devices 4.

Figure 6:
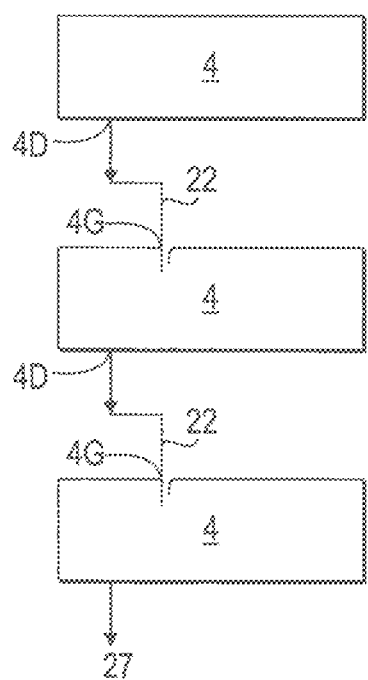
FIG. 6 is a block diagram illustrating an exemplary system with multiple rotating packed bed devices arranged in series.

In one embodiment, as shown in FIG. 6, the system comprises multiple rotating packed bed devices 4 arranged in series. The gas outlet 4D of first rotating packed bed device 4 is connected to a gas inlet 4G of a second rotating packed bed device, and further rotating packed bed devices follow similarly. A gas conduit 22 connects between each pair of serially arranged rotating packed bed devices. The scrubbed flue gas 27 can be eluted at the end of the series.

In one embodiment, the system additionally comprises a level control vessel 5. The level control vessel 5 can be connected to a liquid outlet 4E of the rotating packed bed device 4. In embodiments where there are multiple rotating packed bed devices 4, each rotating packed bed may have its own level control vessel 5, or multiple rotating packed bed devices 4 may share a single level control vessel 5. This optional feature is shown in FIG. 7. Different arrangements and numbers of the rotating packed bed devices 4 and level control vessels 5 can be designed to meet space and cost considerations. In one embodiment, the level control vessel 5 can provide a liquid seal that prevents any flue gas 15 or scrubbed flue gas 27 from going into the liquid outlet 4E. The level control vessel 5 can be installed in a hull of the ship or any other suitable space.

The seawater 1 can have from zero to less than 20 wt % total suspended solids. The TSS can be measured by filtering a well-mixed sample of the seawater 1 through a weighed standard glass fiber filter. The suspended solids are retained on the filter, which is dried at 105° C. and weighed. The increased mass on the filter represents the TSS. ASTM D5907-13, Standard Test Methods for Filterable Matter (Total Dissolved Solids) and Nonfilterable Matter (Total Suspended Solids) in Water, is a method that can be used to determine the TSS when the TSS is from 4 to 20,000 mg/L, or less than 2 wt %. In some embodiments (not shown), the seawater 1 is filtered before being fed to the interior regions 4C of the rotating packed bed device 4. Any suitable means of filtering can be placed upstream of the liquid inlet 4F. Likewise, the seawater 1 can be optionally passed through a membrane unit (not shown) that is located either upstream of the liquid inlet 4F or downstream of the level control vessel 5. The membrane unit can be used for filtering insoluble sulfates from the seawater 1.

In one embodiment, the system additionally comprises a pretreatment device, that removes particulates from the flue gas, located between the connector and the rotating packed bed device. Examples of pretreatment devices include a cyclone, an electrostatic precipitator, a gas filter, and combinations thereof. The flue gas can be cooled and/or filtered prior to passing the flue gas through the gas inlet 4G in the housing 4B. A gas filter, for example, can be used to remove inlet smoke and particulates that might plug porous material in the rotatable packing rings 4A. In one embodiment, the flue gas 15 is passed directly to the rotating packed bed device 4 without any additional cooling.

The rotating packed bed device 4 has a compact size that is suitable for operating on a ship or for retrofitting onto a ship, such as in a hull or a funnel of a ship. In one embodiment, the rotating packed bed device 4 has a height less than 5 meters. In one embodiment, the rotating packed bed device 4 has a height from 0.5 to 5 meters, from 1.0 to 4 meters, or from 1 to 3 meters. In one embodiment, the rotating packed bed device 4 has a width less than 10 meters or less than 5 meters, and the rotating packed bed device 4 fits easily onto the ship and has room for efficient operation and maintenance. The short height and narrow width of the rotating packed bed device enables it to be easily fitted into areas on a ship that previously could not accommodate a flue gas scrubbing device, such as in the hull of the ship, in the funnel, or specific to each of one or more engines on the ship. A funnel is the smokestack or chimney on the ship used to expel smoke or engine exhaust.

In one embodiment, the rotating packed bed device has a packing ring ratio of an internal radius defined by rotatable packing rings and an external radius defined by the rotatable packing rings that is greater than 1.6:1, such as from 1.8:1 to 15:1. This high packing ratio can provide highly efficient means to remove contaminants from the flue gas, due to the high absorption area within the rotating packed bed device and overall small diameter.

Compared to conventional flue gas scrubbing devices, the systems of this invention can be from ½ to 1/200 the volume and provide comparable or better sulfur removal. The short height can be especially desirable, as now the system can easily be installed into areas that could not be used previously, such as in compartments in the hull of a ship or adjacent to engines in tight spaces. In one embodiment, the small size and flexible nature of the rotating packed bed device 4 enables it to be manufactured as a modular system. In one embodiment, the rotating packed bed device 4 is a modular system that is pre-fabricated and can be easily installed on the ship. The modular system can include standard sizes, for example, that can be quickly installed or retrofitted onto a ship. The modular system can allow flexibility, such as by easily adjusting the number and configuration of the rotating packed bed devices to match the size and space availability for different engines. In one embodiment, the providing of the modular system can reduce dry dock time while the system is installed compared to what is required with the installation of larger conventional flue gas scrubbers.

In one embodiment, the rotating packed bed device 4 is retrofitted onto the ship, wherein the ship was previously constructed and operated. In one embodiment, the rotating packed bed device 4 is retrofitted onto the ship or the offshore floating vessel wherein the ship or the offshore floating vessel had a previously used flue gas scrubbing device. In one embodiment, the method of this disclosure includes providing of the rotating packed bed device by retrofitting a previously operated ship or previously operated offshore floating vessel. For example, the method can be used to dramatically reduce the space that is required for flue gas scrubbing. In one embodiment of the method, for example, a volume of the rotating packed bed device is reduced by a factor from 2 to 200 compared to an un-retrofitted volume of a previously used flue gas scrubbing device on the ship or the offshore floating vessel.

In one embodiment, a volume of the rotating packed bed device 4 is reduced by a factor from 2 to 20 compared to a previously used flue gas scrubbing device on the ship or the offshore floating vessel. The reduced size and weight can provide greatly improved system operation and substantial additional shipping volume. In one embodiment, the rotating packed bed device 4 has a weight in operation of 20 to 90% less than what is required for the conventional flue gas scrubbers, which can have weights in operation of greater than 5,000 or 10,000 kg.

In one embodiment, the rotating packed bed device 4 comprises a corrosion resistant material. The corrosion resistant material can be a material that otherwise might be too costly to use in a larger flue gas scrubbing device, such as: a high alloy steel, a Titanium, or any other material or combination of materials that have good resistance to chloride and/or alkali corrosion. In one embodiment, the corrosion resistant material comprises a fiberglass or a polymer. The corrosion resistant material doesn't need to be a metal in embodiments where a pressure in the rotating packed bed device is less than 1000 kPa. In one embodiment, an operating pressure in the rotating packed bed device 4 is from 50 to 2000 kPa.

In one embodiment, the flue gas is produced by a combustion of a heavy fuel oil comprising sulfur on the ship. For example, the heavy fuel oil can comprise from less than 0.1 wt % sulfur up to 5 wt % sulfur. In one embodiment, the flue gas is produced by the combustion of a HSFO on the ship. In the context of this disclosure, HSFO refers to heavy fuel oil with greater than 1.0 wt % sulfur, some of which may exceed ISO international standards for sulfur content.

Heavy fuel oils (HFO) are mainly used as marine fuel on ships, and HFO is the most widely used marine fuel at this time; virtually all medium and low-speed marine diesel engines are designed for heavy fuel oil.

Heavy fuel oil can be a residual fuel produced during the distillation of a crude oil in a refinery. The quality of the residual fuel depends on the quality of the crude oil used in the refinery. To achieve various specifications and quality levels, these residual fuels can be blended with lighter fuels such as MGO or marine diesel oil. The resulting blends are also referred to as intermediate fuel oils (IFO) or marine diesel oil. IFO can be classified and named according to its kinematic viscosity at 50° C. The most commonly used types are IFO 180 and IFO 380, with kinematic viscosities at 50° C. of 180 mm$^2$/s and 380 mm$^2$/s, respectively. If there is a predominance of heavy fuel oil in a blend, it is assigned to the heavy fuel oil category. As these are blends of heavy fuel oil and lighter fuels, they can also be referred to as a heavy marine diesel oil.

ISO 8216 and ISO 8217 international standards describe the categories of marine fuels and provide detailed specifications, respectively. These specifications were developed to meet the requirements for marine fuels supplied on a worldwide basis for consumption on board ships. Internationally, a large number of residual fuel categories are available due to variations in crude oil supplies, refining methods, ship machinery characteristics and other local conditions. However, at a local or national level, the number of available categories can be limited.

The ISO 8217 international standard divides marine fuels into distillate fuels and residual fuels. The latter are collectively called heavy fuel oils. An exception is the lowest viscous quality level, RMA-10, which is no longer referred to as an HFO, as its proportion of heavy fuel oil is so small. ISO 8217 stipulates that residual fuels, and therefore all heavy fuel oils, may not contain used oil or lubricating oils. Heavy fuel oils can be categorized by their sulfur content. According to ISO 8217, the maximum sulfur content of marine fuel for use on a ship must not exceed 3.5 wt %. The following main classes of heavy fuel oils used for marine fuel are distinguished as shown in Table 2.

TABLE 2

Marine Fuel Max. Sulfur Content, wt %

| | |
|---|---|
| High sulfur fuel oil (HSFO) | 3.5 |
| Low sulfur fuel oil (LSFO) | 1.0 |
| Ultra-low sulfur fuel oil (ULSFO) | 0.1 |

Wt % sulfur in fuel can be determined by ASTM D4294 Sulfur in Petroleum Products by Energy-Dispersive X-Ray Fluorescence Spectroscopy.

Wt % sulfur in the flue gas or the scrubbed flue gas is determined using a method that is appropriate for the amount of sulfur and the species of sulfur compounds present in the flue gas or the scrubbed flue gas. Examples of test methods that can be used include lead acetate paper tape, flame photometric detector (FPD) or pulsed flame photometric detector (PFPD) gas chromatography, micro-thermal conductivity detector (μTCD) gas chromatography, combined μTCD and differential mobility detector (DMD) gas chromatography, x-ray spectroscopy, diode array spectroscopy, and combinations thereof. An overview of these various test methods is described by Tim Lenior, "*Analytical Techniques for the determination of sulphur components in flue gas, fuel gas and natural gas*", 2009. Examples of ASTM test methods that could be used include the most recent versions of ASTM D4045, ASTM D2420, ASTM D2622, ASTM D4323, ASTM D4468, ASTM D4810, ASTM D5453, ASTM D5504, ASTM D5623, and combinations thereof.

In one embodiment, the contaminants in the flue gas comprise one or more of a sulfur oxide (SOx), a sulfuric acid, or NOx. In one embodiment, the contaminants comprise a sulfur oxide. The sulfuric acid can be formed in the flue gas when a sulfur oxide, such as sulfur dioxide, reacts with oxygen and water. In one embodiment, the contaminants additionally comprise NOx species, and the scrubbed flue gas additionally has reduced levels of the NOx species.

In one embodiment, the seawater 1 comprises an alkali. The alkali can be an inorganic oxide of the elements of the groups 1 and 2 of the Periodic Table, inorganic hydroxides of the elements of the groups 1 and 2 of the Periodic Table, or mixtures thereof. Some non-limiting examples include $Li_2O$, $Na_2O$, $K_2O$, $Rb_2O$, $Cs_2O$, $Fr_2O$, BeO MgO, CaO, SrO, BaO, LiOH, NaOH, KOH, RbOH, CsOH, FrOH, $Be(OH)_2$, $Mg(OH)_2$, $Ca(OH)_2$, $Sr(OH)_2$, $Ba(OH)_2$, or mixtures thereof. In one embodiment, the seawater 1 comprises from 1 to 50 wt %, such as from 2 to 30 wt %, of the alkali.

In one embodiment, the aqueous liquid removed from a housing 4B of the rotating packed bed device 4 has absorbed the contaminants from the flue gas 15.

The systems comprise a connector from an exhaust pipe on an engine on the ship that feeds the flue gas 15 to the rotating packed bed device 4. The connector may optionally be integrated with a cooler that cools the flue gas 15 before it is fed to the rotating packed bed device 4. In some embodiments, no cooler is needed. In one embodiment, an operating temperature in the rotating packed bed device 4 during the mixing can be from 5° C. to 95° C., or at a sufficient temperature to maintain the seawater 1 in an aqueous phase.

In one embodiment, the flue gas 15 heats the seawater 1 to a higher operating temperature (such as greater than 30° C.), and the thus heated seawater provides enhanced sulfur reduction compared to using an unheated seawater with a lower operating temperature. In the context of this disclosure, the higher operating temperature is at least 5° C. higher than the lower operating temperature.

In one embodiment, the connector comprises a valve that can be shut-off or adjusted to control a stream of the flue gas 15 to the rotating packed bed device 4 in response to one or more of changes in a marine fuel being combusted in the engine, changes in an environmental regulation, changes in a tailwind, or changes in a motion of the ship or the offshore floating vessel. The rotating packed bed device is highly tolerant of a broad range of gas flow rates, unlike conventional flue gas scrubbing systems. Unlike, a conventional flue gas scrubber, the rotating packed bed device 4 is also easy to restart after a shut-down as it achieves steady-state operation in just a few minutes due to its reduced volume and short residence time, so it can be used intermittently as needed.

In one embodiment, the rotating packed bed device 4 comprises one or more rotatable packing rings 4A disposed within a housing 4B wherein the one or more rotatable packing rings 4A define an interior region 4C; a liquid inlet 4F in the housing 4B for feeding the seawater 1 into the interior region 4C, the liquid inlet 4F in communication with an exit port 11A disposed in the interior region 4C for infusing the seawater 1 into the interior region 4C; a gas inlet 4G in the housing 4B for accepting the flue gas 15 comprising the contaminants; a gas outlet 4D for discharging the scrubbed flue gas 27, which has at least partially passed radially outwardly through the one or more rotatable packing rings 4A, from the interior region 4C; a liquid outlet 4E in the housing 4B for removing the seawater 1 from the housing 4B; a rotatable shaft 9, coupled to the one or more rotatable packing rings 4A, that causes the one or more rotatable packing rings 4A to rotate; and a motor 10 coupled to the rotatable shaft 9 for driving the rotatable shaft 9.

In one embodiment, the system comprises:
a. the rotating packed bed device on the ship, the rotating packed bed device comprising: the one or more rotatable packing rings disposed within the housing wherein the one or more rotatable packing rings 4A define the interior region; the liquid inlet in the housing 4B for feeding the seawater 1 into the interior region 4C, the liquid inlet 4F in communication with the exit port 11A disposed in the interior region 4C for infusing the seawater 1 having less than 20 wt % total suspended solids into the interior region 4C; the gas inlet 4G in the housing 4B for accepting the flue gas 15 comprising the contaminants; the gas outlet 4D for discharging the scrubbed flue gas 27, which has at least partially passed radially inwardly or outwardly through the one or more rotatable packing rings 4A, from the interior region 4C; the liquid outlet 4E in the housing 4B for removing the seawater 1 from the housing 4B; the rotatable shaft 9, coupled to the one or more rotatable packing rings 4A, that causes the one or more rotatable packing rings 4A to rotate; and the motor 10 coupled to the rotatable shaft 9 for driving the rotatable shaft 9; and
b. a connector from an exhaust pipe on an engine on the ship that feeds the flue gas 15 to the rotating packed bed device 4.

In one embodiment, the method includes infusing the seawater by way of the exit port into the interior region, wherein the seawater passes radially outwardly through each of the one or rotatable packing rings and contacts the flue gas, thereby scrubbing the contaminants from the flue gas; and removing the seawater from the housing through the liquid outlet.

In one embodiment, the rotating packed bed device 4 can be operated intermittently as needed to meet low sulfur standards for a discharge of a gas to atmosphere. In some embodiments, the connector can be disconnected or adjusted to control a stream of the flue gas 15 to the rotating packed bed device 4 in response to changes in a marine fuel being combusted in the engine on the ship. Different fuels are used (or available) at different times, and in different geographic regions, and the amount of contaminants in the flue gas 15 can vary. At times the connector can be disconnected, for example, when the marine fuel being combusted is a ULSFO.

In one embodiment, the rotating packed bed device has a high turndown ratio and provides highly flexible operation. For example, the rotating packed bed device can have a turndown ratio greater than 3, such as from 5 to 25, and retains an ability to reduce the sulfur.

In one embodiment, the rotating packed bed device is operated under varied flow rates of the flue gas 15 or the seawater 1 through the rotating packed bed device. The rotating packed bed device 4 provides enhanced mass transfer and offers much more flexible operation than conventional flue gas scrubbing processes.

The flue gas 15 has from 0.1 wt % up to 5.0 wt % of a sulfur and the scrubbed flue gas 27 has from zero to less than 1.0 wt % of the sulfur, which is less than half of the sulfur that was originally present in the flue gas 15 before the mixing. The scrubbed flue gas 27 has at least half of the sulfur in the flue gas 15 removed. The scrubbed flue gas 27 is much healthier for release into the atmosphere compared to the flue gas 15. In one embodiment, the scrubbed flue gas 27 has from 0.1 to 30 percent of the of the sulfur that was originally present in the flue gas 15 before the mixing. In one embodiment, the scrubbed flue gas 27 comprises from zero to less than 0.1 wt % of the sulfur.

In one embodiment, the seawater 1 is removed from the rotating packed bed device 4 and discharged into an ocean environment. In one embodiment, the seawater 1 is removed from the rotating packed bed device 4 and at least a portion of a removed seawater is collected in a spent seawater collector 7. The system can comprise a spent seawater collector 7 that is connected to a liquid outlet 4E of the rotating packed bed device 4 and collects at least a portion of the seawater 1 that is discharged from the rotating packed bed device 4. In one embodiment, the spent seawater collector 7 can also be used as a level control vessel 5, provided it is designed for this purpose.

Various environmental regulations provide numeric limits for exhaust gas scrubber effluents that can be discharged to the ocean environment. In one embodiment, the discharged aqueous liquid 8 has a pH of no less than 6.0 measured at the ship's overboard discharge. Some jurisdictions may require that into waters subject to discharge permits, that samples of the discharged aqueous liquid 8 be periodically collected for analysis of HFO using specified methods to demonstrate treatment equipment maintenance and compliance with various regulations. The portion of the removed aqueous liquid collected in the spent seawater collector 7 can also be tested for assurance that it meets all other regulatory requirements for discharge into the ocean environment. Even new regulatory requirements can be met and audited with the systems of this disclosure.

In embodiments with higher amounts or concentrations of alkali in the seawater 1, less seawater 1 can be needed to be mixed with the flue gas 15. This can reduce the volume of the discharged aqueous liquid 8 that is discharged into an ocean environment or collected in a spent seawater collector 7.

In one embodiment, the spent seawater collector 7 and/or the level control vessel 5 can be corrosion resistant. Corrosion resistance can be especially needed when the aqueous liquid used in the method comprises an alkali. Seawater can also be corrosive, especially un-de-aerated seawater. In one embodiment, the spent seawater collector 7 and/or the level control vessel 5 comprise a high alloy steel, such as an austenitic stainless steel alloy.

In embodiments where the aqueous liquid comprises higher levels of the alkali, the size of the spent seawater collector 7 can be much smaller than in conventional flue gas scrubbing systems. In one embodiment, the spent seawater collector 7 has a collector volume less than 15 $m^3$, such as from 1.0 to 10.0 $m^3$. The small size and collector volume of the spent seawater collector 7 enable it to be easily placed on the ship or offshore floating vessel, and the cost of using corrosion resistant materials in its construction are not an obstacle.

In one embodiment, the spent seawater collector and/or a level control vessel each have a collector volume less than 15 $m^3$, such as from 1.0 to 10.0 $m^3$.

The methods and systems described herein utilizing a rotating packed bed device are uniquely suitable for flue gas scrubbing on ships. These devices are very compact and although they require some maintenance and monitoring to assure consistent operation, these maintenance tasks can be done easily on a ship that has operation and maintenance personnel living and working onboard, who operate and maintain the engines and other rotating equipment.

This application also provides a marine ship that performs the methods and/or comprises the systems described herein. For example, the marine ship can comprise:
 a. an engine that combusts a high sulfur fuel oil (HSFO);
 b. a lift pump that draws a seawater into the marine ship;
 c. a rotating packed bed device, in a hull or a funnel of the marine ship, comprising a rotating shaft and a porous material in a rotating packed bed configured to mix the seawater with a flue gas from the engine in an outwardly direction and at a volume flow ratio of a flue gas-volume flow to a seawater-volume flow rate from 1:1 to 300:1 within the rotating packed bed device to reduce a sulfur in the flue gas; and
 d. a connector from an exhaust pipe on the engine and the rotating packed bed device.

In one embodiment, the marine ship comprises the rotating packed bed device, wherein the rotating packed bed device is configured to provide a pressure increase from an interior region in the rotating packed bed device to an exterior region 4H in the rotating packed bed device from 0 kPa to 50 kPa.

In one embodiment, the marine ship has a rotating packed bed device that comprises one or more packing rings of a porous material that operate under a sufficient centrifugal force to provide a seawater holdup in the rotating packed bed device from 0.01 to 0.50 wt %.

In one embodiment, the marine ship comprises a rotating packed bed device that has a high packing ring ratio, such as a packing ring ratio of an internal radius defined by rotatable packing rings and an external radius defined by the rotatable packing rings of 1.8:1 to 15:1.

EXAMPLES

Example 1

A two-dimensional Computational Fluid Dynamics (CFD) simulation was done on a rotating packed bed device sized for installation on a marine ship with a 20 MW engine. The rotated packed bed device comprised rotatable packing rings made of metal foam. The packing rings rotated at a speed of 1000 RPM. The metal foam was NCX-1723. The viscous resistance of the metal foam for the flue gas flow was $1.5 \times 10^{-7}$ (1/m$^2$). The rotatable packing rings defined an interior region with an internal radius of 0.435 meters and an exterior region 4H with an external radius of 1.6 meters. The packing ring ratio of the internal radius defined by the rotatable packing rings and the external radius defined by the rotatable packing rings was 3.678. The height of the rotating packed bed device was 4.3 meters.

The operating conditions for the rotating packed bed device included co-current flue gas and seawater flow from the center interior region of the rotating packed bed flowing outwardly. The flue gas flow rate was 127,000 Nm$^3$/hr. The seawater flow rate was 1710 m$^3$/hr. In this configuration, the volume flow ratio of the flue gas-volume flow rate to the seawater-volume flow rate was 74.3:1.

The rotating packed bed device in this CFD simulation comprised a liquid distributor 24 positioned in the middle of the rotating packed bed device 4. The liquid distributor 24 was like that shown in FIG. 3, but the small liquid orifices 29 in this simulation were narrow slots, rather than a line of circular openings as shown in FIG. 3. There were eight 3 mm wide slots evenly spaced around the perimeter of the liquid distributor 24, in the interior region 4C of the rotating packed bed device 4.

Figure 8B:
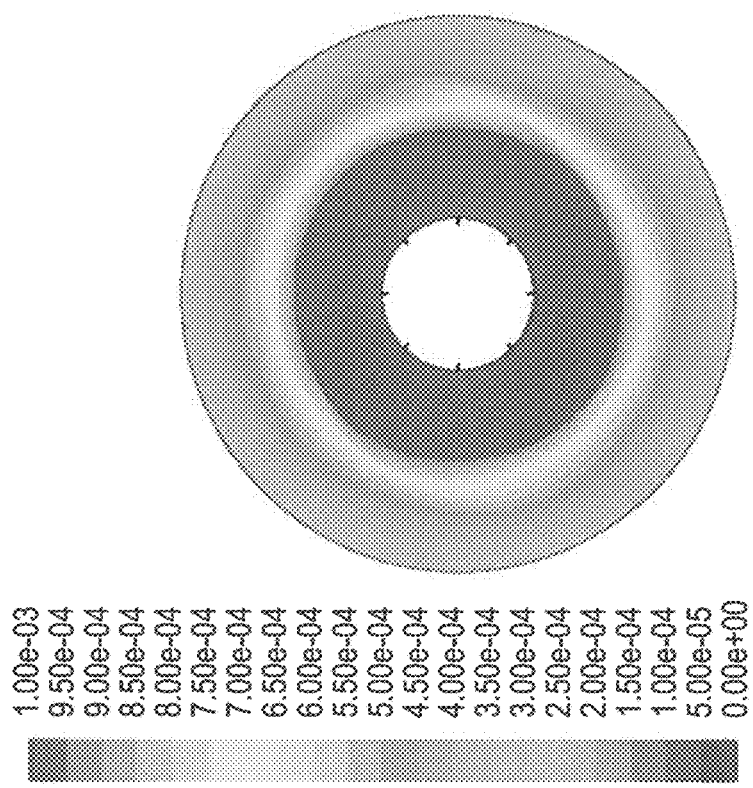
FIG. 8B shows the liquid volume fraction profile by CFD simulations for one embodiment (0 to 0.1 vol % contour) of the rotating packed bed device used in the methods and systems of this disclosure.
Figure 8A:
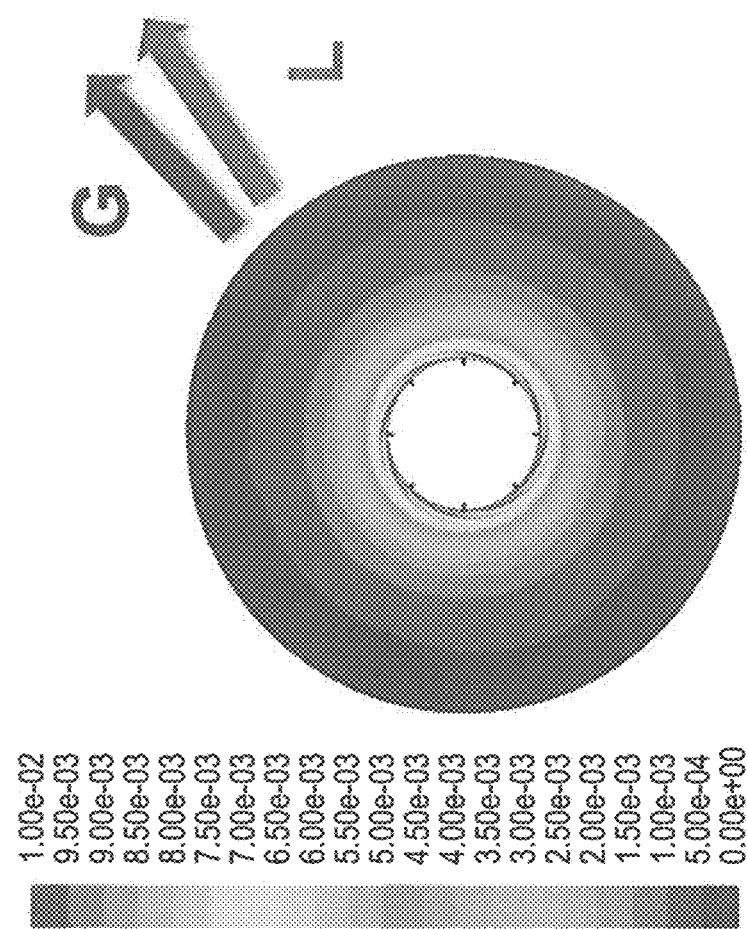
FIG. 8A shows the liquid volume fraction profile by Computational Fluid Dynamics (CFD) simulations for one embodiment (0 to 1 vol % contour) of the rotating packed bed device used in the methods and systems of this disclosure.

Two different contours were simulated and the results are shown in FIG. 8A and FIG. 8B. FIG. 8A shows the liquid volume fraction profile at a contour of 0 to 1 vol %. FIG. 8A shows even flue gas distribution, in blue, through the entire width and area of the rotatable packing rings 4A in the rotating packed bed device 4. FIG. 8B shows the liquid volume fraction profile at a contour of 0 to 0.1 vol %. FIG. 8B shows even seawater wetting, in red with liquid volume fraction of 0.1% or higher, over the full area and over greater than half of the width of the rotatable packing rings 4A in the rotating packed bed device 4. Under these simulation conditions, the total pressure increase from the interior region 4C to the exterior region 4H of the rotating pack bed device was 13.8 kPa. The pressure at the exterior of the rotating packed bed device was higher than the pressure in the interior region of the rotating packed bed device. This simulation shows that this configuration would provide desired increased pressure at the outlet of the rotating packed bed device, sufficient to prevent back pressure on the ship engine producing the flue gas. This effect of increasing the pressure would also reduce power consumption. Another benefit that was achieved in this configuration was very low seawater hold-up in the metal foam. In this simulation the average seawater holdup was only 0.1255 wt % (40.1 kg).

Example 2

A second two dimensional CFD simulation was done on a rotating packed bed device with the same design and operating conditions as in Example 1. The only change was that the viscous resistance of the metal foam for the flue gas flow was changed to $3.048 \times 10^{-8}$ (1/m$^2$).

Figure 9B:
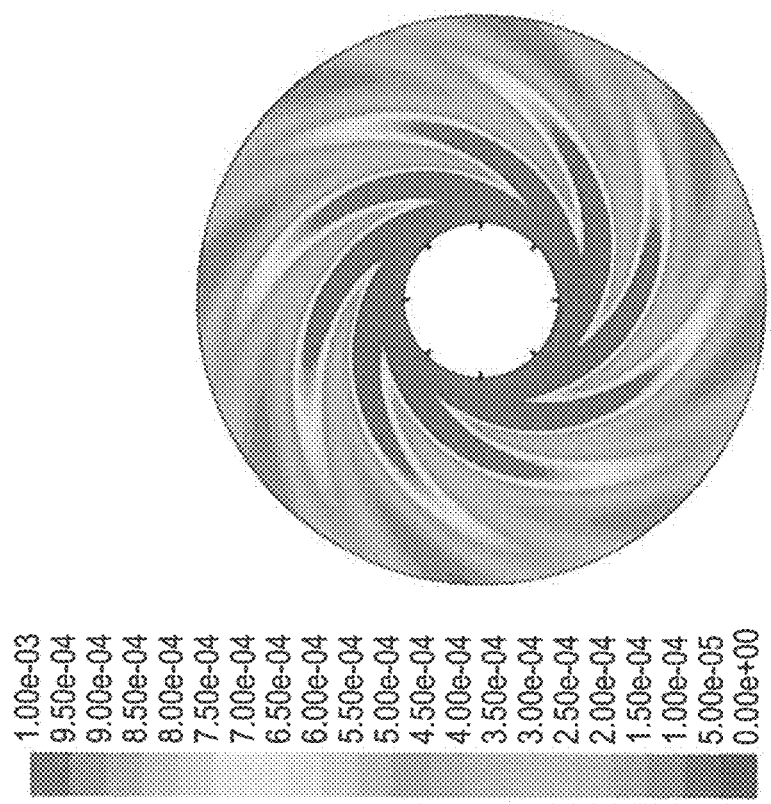
FIG. 9B shows the liquid volume fraction profile by CFD simulations for one embodiment (0 to 0.1 vol % contour) of the rotating packed bed device used in the methods and systems of this disclosure.
Figure 9A:
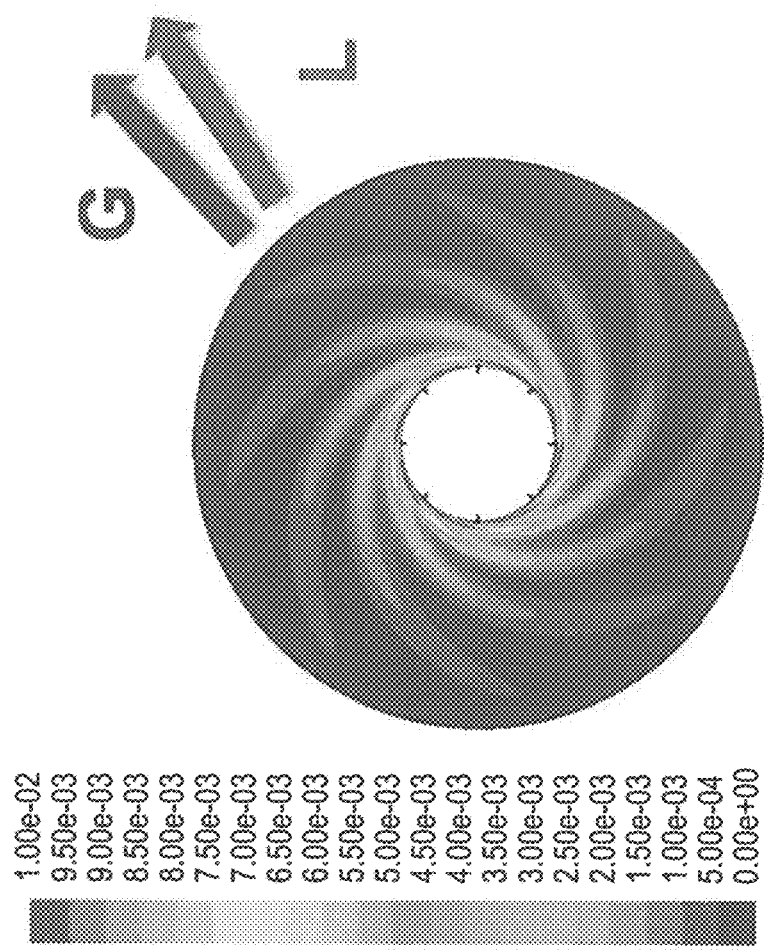
FIG. 9A shows the liquid volume fraction profile by CFD simulations for one embodiment (0 to 1 vol % contour) of the rotating packed bed device used in the methods and systems of this disclosure.

Two different contours were again simulated and the results are shown in FIG. 9A and FIG. 9B. FIG. 9A shows the liquid volume fraction profile at a contour of 0 to 1 vol %. FIG. 9A shows good flue gas distribution, in blue, through the entire width and area of the rotating packed bed device. The effect of the placement of the slots in the liquid distributor can be seen in this configuration. FIG. 9B shows the liquid volume fraction profile at a contour of 0 to 0.1 vol %. FIG. 9B shows good seawater wetting, in red with liquid volume fraction of 0.1% or higher, over a significant area and across about 80% of the width of the rotatable packing rings in the rotating packed bed device. Under these simulation conditions, the total pressure increase from the interior region to the exterior region 4H of the rotating pack bed device was 7.1 kPa. This configuration would also provide desired increased pressure at the outlet of the rotating packed bed device, sufficient to prevent back pressure on the ship engine producing the flue gas. As in Example 1, the effect of increasing the pressure would reduce power consumption. In this simulation the average seawater holdup was even lower, 0.0851 wt % (27.2 kg).

Several other CFD simulations were done with different flue gas and seawater flow configurations, but the results obtained in Example 1 and Example 2 gave the best performance for liquid distribution and increased pressure.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

The invention illustratively disclosed herein suitably may be practiced in the absence of any element which is not specifically disclosed herein.

It is claimed:

1. A method for operating a rotating packed bed device on a ship or on an offshore floating vessel, comprising:
   a. providing a rotating packed bed device onboard of the ship or onboard of the offshore floating vessel wherein the rotating packed bed device is configured to provide a pressure increase from an interior region in the rotating packed bed device to an exterior region in the rotating packed bed device;
   b. mixing a seawater, having less than 20 wt % total suspended solids, with the flue gas in the rotating packed bed device via co-current flue gas and seawater flow from the center interior region of the rotating packed bed flowing outwardly under a sufficient centrifugal force in the rotating packed bed device to prevent a blow-by of the flue gas and producing a scrubbed flue gas;
   c. discharging the scrubbed flue gas from the ship or the offshore floating vessel;
   wherein a volume flow ratio of a flue gas-volume flow rate to a seawater-volume flow rate during the mixing is from 1:1 to 300:1; and
   wherein the flue gas has from 0.1 wt % up to 5.0 wt % of a sulfur and the scrubbed flue gas has from zero to less than 1.0 wt % of the sulfur, which is less than half of the sulfur that was originally present in the flue gas before the mixing.

2. The method of claim 1, wherein rotating packed bed devices comprises one or more rotatable packing rings, wherein the one or more rotatable packing rings define an interior region and an exterior region in the rotating packed bed device, and wherein a gas inlet and a liquid inlet are positioned in the interior region and provide flows of the flue gas and the seawater directionally outward from the interior region to the exterior region.

3. The method of claim 1, wherein a pressure increase from an interior region in the rotating packed bed device to an exterior region in the rotating packed bed device is from 0 kPa to 50 kPa.

4. The method of claim 1, wherein the sufficient centrifugal force provides a seawater holdup in the rotating packed bed device from 0.01 to 0.50 wt %.

5. The method of claim 1, wherein the rotating packed bed device has a packing ring ratio of an internal radius defined by rotatable packing rings and an external radius defined by the rotatable packing rings of 1.8:1 to 15:1.

6. The method of claim 1, wherein the sufficient centrifugal force is a RCF from greater than 4 up to 10,000.

7. The method of claim 1, wherein the seawater additionally comprises an alkali.

8. The method of claim 1, wherein during the mixing, one or more rotatable packing rings in the rotating packed bed device rotate at a tip velocity of 3 to 200 m/s.

9. The method of claim 1, wherein during the mixing, one or more rotatable packing rings in the rotating packed bed device rotate at a speed of from 200 to 3000 RPM.

10. The method of claim 1, wherein the rotating packed bed device comprises a porous material with a surface area per unit volume from about 200 to about 6,000 $m^2/m^3$.

11. The method of claim 1, wherein the rotating packed bed device is operated intermittently as needed to meet low-sulfur standards for a discharge of a gas to an atmosphere.

12. The method of claim 1, wherein the rotating packed bed device is operated under varied flow rates of the flue gas or the seawater through the rotating packed bed device.

13. The method of claim 1, wherein the rotating packed bed device has a turndown ratio from 5 to 25 and retains an ability to reduce the sulfur.

14. The method of claim 1, wherein the seawater is removed from the rotating packed bed device and at least a portion of a removed seawater is collected in a spent seawater collector.

15. The method of claim 1, wherein the seawater is removed from the rotating packed bed device and discharged into an ocean environment.

16. The method of claim 1, wherein the providing of the rotating packed bed device is done by retrofitting a previously operated ship or a previously operated offshore floating vessel.

17. The method of claim 16, wherein a volume of the rotating packed bed device is reduced by a factor from 2 to 200 compared to an un-retrofitted volume of a previously used flue gas scrubbing device on the ship or the offshore floating vessel.

18. The method of claim 1, wherein the rotating packed bed device comprises one or more rotatable packing rings disposed within a housing wherein the one or more rotatable packing rings define an interior region; a liquid inlet in the housing for feeding the seawater into the interior region, the liquid inlet in communication with an exit port disposed in the interior region for infusing the seawater into the interior region; a gas inlet in the housing for accepting the flue gas comprising the contaminants; a gas outlet for discharging the scrubbed flue gas, which has at least partially passed radially outwardly through the one or more rotatable packing rings, from the interior region; a liquid outlet in the housing for removing the seawater from the housing; a rotatable shaft, coupled to the one or more rotatable packing rings, that causes the one or more rotatable packing rings to rotate; and a motor coupled to the rotatable shaft for driving the rotatable shaft.

19. The method of claim 18, additionally comprising: infusing the seawater by way of the exit port into the interior region, wherein the seawater passes radially outwardly through each of the one or more rotatable packing rings and contacts the flue gas, thereby scrubbing the contaminants from the flue gas; and removing the seawater from the housing through the liquid outlet.

20. The method of claim 1, wherein the flue gas heats the seawater to a higher operating temperature in a heated-seawater and the heated-seawater provides enhanced reduction of the sulfur compared to using an unheated-seawater with a lower operating temperature.

21. A system for removing the contaminants from the flue gas on the ship or the offshore floating vessel according to the method of claim 1, comprising:
   a. the rotating packed bed device on the ship or the offshore floating vessel; and
   b. a connector from an exhaust pipe on an engine on the ship or the offshore floating vessel that feeds the flue gas to the rotating packed bed device; and
   c. a lift pump connected to a liquid inlet of the rotating packed bed device for drawing the seawater from an ocean environment into the rotating packed bed device,
   d. co-current feed of flue gas and seawater flow from the center interior region of the rotating packed bed.

22. The system of claim 21, wherein the rotating packed bed device is configured to propel the flue gas and the seawater directionally outward through the rotating packed bed device.

23. The system of claim 21, wherein the rotating packed bed device comprises one or more rotatable packing rings of a porous material that operate under the sufficient centrifugal force to provide a seawater holdup in the rotating packed bed device from 0.01 to 0.50 wt %.

24. The system of claim 21, wherein the rotating packed bed device has a packing ring ratio of an internal radius defined by one or more rotatable packing rings and an external radius defined by the one or more rotatable packing rings of 1.8:1 to 15:1.

25. The system of claim 21, wherein the rotating packed bed device comprises one or more rotatable packing rings comprising a porous material with a surface area per unit volume from about 200 to about 6,000 $m^2/m^3$.

26. The system of claim 21, wherein the rotating packed bed device has a height from 0.5 to 5 meters.

27. The system of claim 21, wherein the rotating packed bed device is a modular system that is easily installed on the ship.

28. The system of claim 21, wherein the rotating packed bed device comprises rotatable sets of packing rings that rotate in a co-current direction, in a counter-current direction, or in a combination thereof.

29. The system of claim 21, wherein the connector comprises a valve that can be shut-off or adjusted to control a stream of the flue gas to the rotating packed bed device in response to one or more of changes in a marine fuel being combusted in the engine, changes in an environmental regulation, changes in a tailwind, or changes in a motion of the ship or the offshore floating vessel.

30. The system of claim 21, wherein the system comprises multiple rotating packed bed devices arranged in parallel, arranged in series, or arranged in a combination thereof.

31. The system of claim 21, wherein the system comprises multiple engines on the ship and multiple rotating packed bed devices.

32. The system of claim 21, additionally comprising a level control vessel connected to a liquid outlet of the rotating packed bed device.

33. The system of claim 21, additionally comprising a spent seawater collector connected to a liquid outlet of the rotating packed bed device that collects at least a portion of the seawater that is discharged from the rotating packed bed device.

34. The system of claim 33, wherein the spent seawater collector and/or a level control vessel each have a collector volume from 1.0 to 10.0 $m^3$.

35. A marine ship, comprising:
a. an engine that combusts a high sulfur fuel oil (HSFO);
b. a lift pump that draws a seawater into the marine ship;
c. a rotating packed bed device, in a hull or a funnel of the marine ship, comprising a rotating shaft and a porous material in a rotating packed bed configured provide a pressure increase from an interior region in the rotating packed bed device to an exterior region in the rotating packed bed device via co-current feed of flue gas and seawater flow from the center interior region of the rotating packed bed in an outwardly direction and at a volume flow ratio of a flue gas-volume flow to a seawater-volume flow rate from 1:1 to 300:1 within the rotating packed bed device to reduce a sulfur in the flue gas; and
d. a connector from an exhaust pipe on the engine and the rotating packed bed device.

36. The marine ship, according to claim 35, wherein the rotating packed bed device comprises one or more rotatable packing rings of the porous material that operate under a sufficient centrifugal force to provide a seawater holdup in the rotating packed bed device from 0.01 to 0.50 wt %.

37. The marine ship, according to claim 35, wherein the rotating packed bed device has a packing ring ratio of an internal radius defined by one or more rotatable packing rings and an external radius defined by the one or more rotatable packing rings of 1.8:1 to 15:1.

38. The marine ship, according to claim 35, wherein the rotating packed bed device has a packing ring ratio of an internal radius defined by one or more rotatable packing rings and an external radius defined by the one or more rotatable packing rings of 1.8:1 to 15:1.

* * * * *